United States Patent [19]
Schebler et al.

[11] Patent Number: 4,567,909
[45] Date of Patent: Feb. 4, 1986

[54] OXYGEN PARTIAL PRESSURE CONTROLLER FOR A PRESSURE SWING ADSORPTION SYSTEM

[75] Inventors: Bernard J. Schebler, Davenport; Russell F. Hart, Blue Grass, both of Iowa

[73] Assignee: Litton Systems, Inc., Davenport, Iowa

[21] Appl. No.: 474,130

[22] Filed: Mar. 10, 1983

[51] Int. Cl.[4] .................................... G05D 21/02
[52] U.S. Cl. ................................ 137/81.1; 137/115; 137/118
[58] Field of Search .............. 137/115, 118, 81.1; 436/136; 128/204.23, 204.22

[56] References Cited

U.S. PATENT DOCUMENTS

| | | | |
|---|---|---|---|
| 3,002,521 | 10/1961 | Greenlees et al. | 137/115 |
| 3,113,582 | 12/1963 | Hudson | 137/115 |
| 3,572,356 | 3/1971 | Pinto | 137/81.1 |
| 3,658,479 | 4/1972 | Heijne et al. | 436/136 |
| 3,958,466 | 5/1976 | Espenschied | 137/115 |

*Primary Examiner*—Martin P. Schwadron
*Assistant Examiner*—James R. Shay
*Attorney, Agent, or Firm*—Brian L. Ribando

[57] ABSTRACT

An oxygen partial pressure controller regulates the oxygen partial pressure ($PPO_2$) of the product gas of a pressure swing adsorption oxygen enriching system by means of a bleed valve which increases gas flow through the adsorptive system thereby decreasing the $PPO_2$ of the product gas. The controller includes a solenoid valve which permits the bleed valve to function when the adsorption system pressure and $PPO_2$ is high. An aneroid controls the product gas flow as a function of altitude when the bleed valve is permitted to function.

3 Claims, 1 Drawing Figure

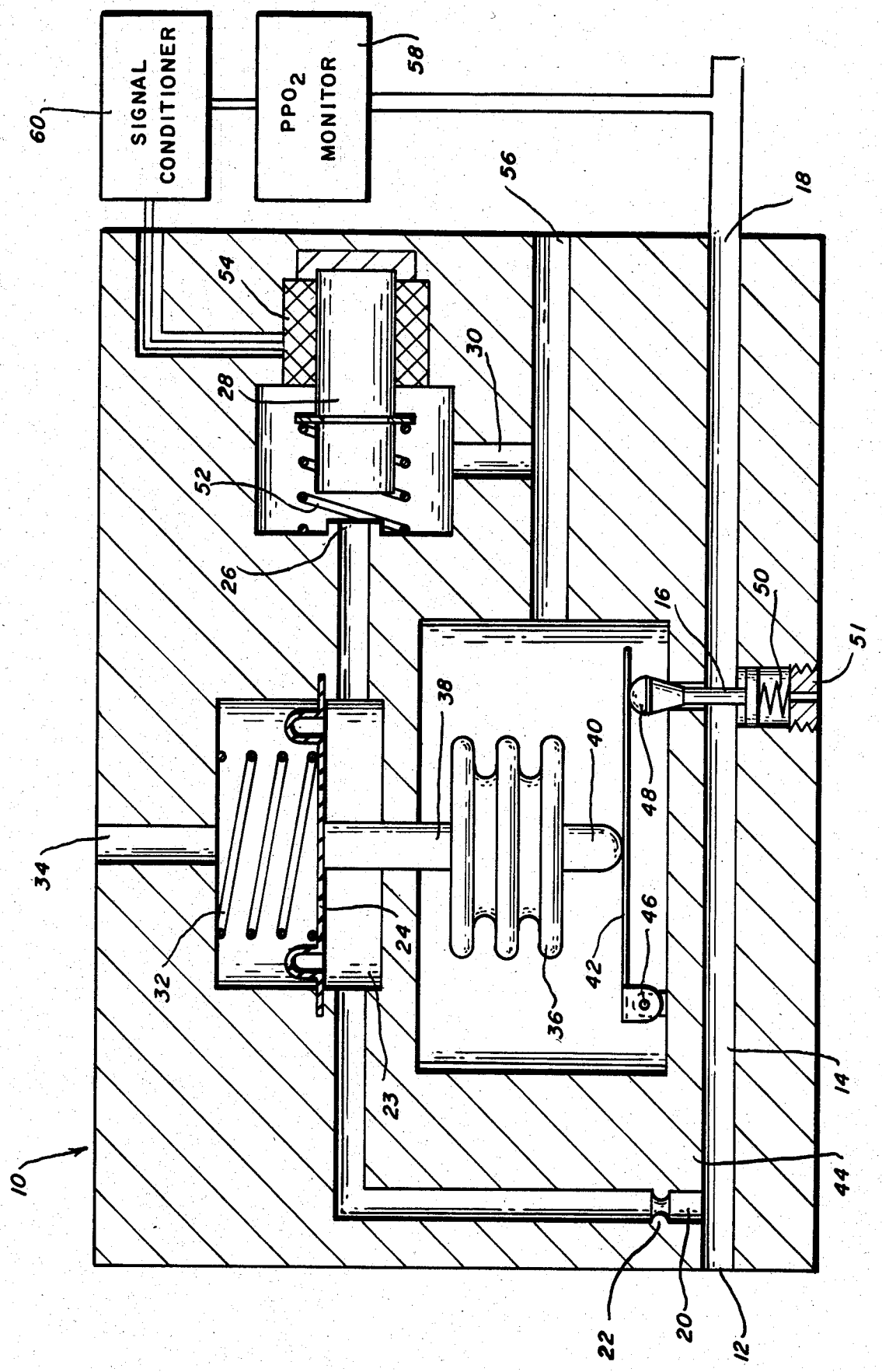

OXYGEN PARTIAL PRESSURE CONTROLLER FOR A PRESSURE SWING ADSORPTION SYSTEM

BACKGROUND OF THE INVENTION

In aircraft breathing systems where oxygen enrichment may be achieved through on-board oxygen generation, one means of generating an oxygen rich product gas is by fractionalizing air. Air fractionalizing is usually accomplished by alternating the flow of high pressure air through each of two beds of molecular sieve material such as a zeolite. This process is identified as the pressure swing adsorption technique.

The oxygen concentration of the enriched product gas of a pressure swing adsorption system decreases as the product gas flow through the system increases. It is therefore possible to control the oxygen partial pressure ($PPO_2$) within a fixed range or vary the $PPO_2$ in accordance with other parameters such as aircraft cabin pressure or altitude and/or breathing system pressure. For example, it could be desirable in a high altitude aircraft to maintain a preset minimum oxygen concentration at lower altitudes and thereafter increase the oxygen concentration as the altitude of the aircraft increases in order to hold the $PPO_2$ constant.

SUMMARY AND OBJECTS OF THE INVENTION

According to the invention an oxygen partial pressure controller for a pressure swing adsorption system is used to control the oxygen partial pressure ($PPO_2$) of the product gas by bleeding a portion of the product gas to the atmosphere thereby increasing the product gas flow and decreasing the $PPO_2$. The bleed flow is controlled as an indirect function of altitude creating a constant $PPO_2$ profile. Accordingly, the oxygen percentage must vary (increase) with increasing altitude. The bleed flow is also controlled as a direct function of the breathing system pressure and is thereby maintained between a preset maximum and zero. A $PPO_2$ monitor acts in conjunction with the controller to establish a preset minimum $PPO_2$ level.

Though the description of the controller focuses on a constant $PPO_2$, it is understood that the $PPO_2$ profile can be made to vary with other parameters or combination of parameters such as altitude and/or temperature.

It is therefore an object of this invention to provide an oxygen partial pressure controller for a pressure swing adsorption system for monitoring and establishing a predetermined oxygen partial pressure ($PPO_2$) by selectively bleeding a portion of the product gas to the atmosphere thereby increasing the product gas flow and decreasing the $PPO_2$.

It is another object of the invention to provide an aneroid control means for modifying the bleed flow rate profile to decrease with altitude as in an aircraft.

BRIEF DESCRIPTION OF THE DRAWINGS

The sole FIGURE is a schematic representation of an oxygen partial pressure controller for use with a pressure swing adsorption system and which includes aneroid means for varying the product gas bleed flow with changing altitude.

BRIEF DESCRIPTION OF THE PREFERRED EMBODIMENT

An oxygen partial pressure ($PPO_2$) controller as schematically represented in the FIGURE is used in conjunction with an air fractionalizing oxygen enrichment system. The controller regulates the $PPO_2$ of the product gas of the fractionalizing system. Air fractionalizing is accomplished by alternating the flow of high pressure air through each of two beds of molecular sieve material such as a zeolite. This process is referred to as the pressure swing adsorption technique.

In a pressure swing adsorption system, the $PPO_2$, or oxygen concentration, of the system decreases as the product gas flow through the system increases and vice versa. The controller described herein bleeds a controlled portion of the high pressure product gas to atmosphere thereby reducing the $PPO_2$ of the product gas by increasing the gas flow through the system.

Referring to the FIGURE, an oxygen partial pressure controller 10 includes an inlet 12 which is connected to the outlet of a pressure swing adsorption system (not shown) and through which the product gas of that system flows. The product gas is directed in a first line 14 to the inlet of a bleed valve 16 and to the controller outlet 18. Product gas exiting the outlet 18 is piped to the user which in the example of a high altitude aircraft can be either the pilot through a breathing mask or the cabin in which the pilot resides.

The product gas is directed in a second line 20 through a fixed orifice flow restrictor 22 to a chamber 23 on a first side of a diaphragm 24. The product gas in the second line 20 is also directed to the inlet port 26 of a normally open electrical solenoid valve 28. The outlet port 30 of the solenoid valve 28 communicates with the atmosphere which in the case of a high altitude aircraft can be represented by aircraft cabin pressure or atmospheric pressure at the aircraft altitude.

The second side of the diaphragm 24 is biased by a compression spring 32 and pneumatically vents to the atmosphere, cabin or altitude, through a controller exit port 34. An aneroid 36 is mechanically connected to the first side of the diaphragm 24 by means of a stem 38. Attached to the aneroid 36 opposite the stem 38 is a stub member 40 which is in contact with a valve actuating arm 42. The actuating arm 42 is rotatively attached to the controller housing 44 at a pivot 46 at one end. At its other end, the actuating arm 42 restrains a poppet 48 of the balanced bleed valve 16 which is biased by a compression spring 50. The bias level of the spring 50 is adjusted by a vented screw cap 51 which threadedly engages the housing 44.

The normally open solenoid valve 28 is retained open by a compression spring 52 and is closed when a coil 54 is electrically excited. The electrical signal for actuating the solenoid valve 28 originates in a commercially available polarographic oxygen sensor 58 which generates an electrical signal proportional to the $PPO_2$. This signal is compared to a preset electrical signal in a signal conditioner 60, and when the sensor output exceeds this preset threshold, an error signal is generated, amplified, and supplied by the signal conditioner 60 to the solenoid coils 54 closing the valve 28.

MODE OF OPERATION OF THE PREFERRED EMBODIMENT

The product gas from a pressure swing adsorption system (not shown) enters the controller 10 at the inlet 12 and is directed to the bleed valve 16 and the controller outlet 18. If the bleed valve 16 is closed, as illustrated, no product gas is bled off. When the valve 16 is open, a portion of the product gas bleeds past the poppet 48 and exits to the atmosphere through the exit port 56. This bleed path to atmosphere increases the differential pressure across the pressure swing adsorption system, from its high pressure air source to the atmospheric pressure at port 56, and thus increases the gas flow through the system thereby decreasing the PPO$_2$ of the gas exiting the controller at the outlet 18 and the port 56.

The bleed valve 16 actuation is controlled by the product gas which is directed through the line 20 through the restrictive orifice 22 and to the chamber 23. If the coil 54 of the electrical solenoid valve 28 is not excited, the normally open valve 28 allows the control gas to flow through the inlet port 26, the outlet port 30, and exit port 56 to the atmosphere thereby holding the bleed valve 16 closed by the compression spring 32 acting through the mechanical linkage comprised of the diaphragm 24, the stem 38, the aneroid 36, the stub member 40, and the actuating arm 42.

An electrical signal excites the coil 54 of the solenoid valve 28 when the polarographic oxygen sensor 58 together with the signal conditioner 60 create an error signal indicating that the PPO$_2$ is at or above a preset level. At that point, the inlet port 26 of the solenoid valve 28 is closed and the pressure in the chamber 23 increases from the atmospheric pressure at the port 56 to the system pressure at the inlet 12. If the pressure at the inlet 12 is at or above a predetermined minimum, the pressure in the chamber 23 will displace the diaphragm 24 against the compressing spring 32. As the diaphragm 24, acting as a pneumatic amplifier, is displaced, the assembly comprised of the stem 38, the aneroid 36 and the stub 40 is displaced with it allowing the spring 50 to open the blanaced bleed valve 16 by displacing its poppet 48 as the poppet moves the actuating arm 42 about the pivot 46.

The aneroid 36 is an evacuated aneroid which expands along the axis of the stem 38 and stub 40 when the atmospheric pressure decreases and contracts as the atmospheric pressure increases. When the atmospheric pressure at the port 56 decreases, as in an ascending aircraft, the aneroid 36 expands and, if the pressure in the chamber 23 is sufficiently high so as to displace the diaphragm 24 and open the bleed valve 16, the aneroid expansion will cause the actuating arm 42 to partially close the valve 16 to reduce the bleed flow and increase the PPO$_2$ in the product gas at the outlet 18. Conversely, when the atmopheric pressure at the port 56 increases, as in a decending aircraft, the aneroid 36 contracts allowing increased bleed flow through the valve 16 if the pressure in the chamber 23 is sufficiently high to displace the diaphragm 24. This action decreases the PPO$_2$ in the product gas.

The PPO$_2$ level relative to atmospheric pressure is controlled by adjusting the bias of the spring 50 by means of the threaded screw cap 51.

Using the system described above in a high altitude aircraft allows for very high oxygen percentage when the aircraft is at high altitudes and greatly reduced oxygen percentage levels at low altitudes. It is obvious that the bleed control provided by the aneroid 36 could be replaced by an equivalent control which varied as a function of a parameter other than atmospheric pressure, e.g. temperature.

The controller described includes an electrical solenoid which responds to an electrical signal originating in the polarographic oxygen sensor. Oxygen sensors are commercially available which output a pneumatic pressure signal proportional to PPO$_2$. It is understood that this invention applies equally to a controller comprised of a pneumatically actuated solenoid valve responding to the pressure signal of a pneumatic output oxygen sensor.

What is claimed is:

1. An oxygen partial pressure controller for regulating the oxygen partial pressure (PPO$_2$) of the product gas of a pressure swing adsorption oxygen enriching system which is operating at a system pressure applied to the inlet of the controller, in which the PPO$_2$ of the product gas is inversely proportional to the flow of product gas through the system, said controller utilizing a conventional PPO$_2$ monitor and signal conditioning elements, said controller comprising:
   a bleed valve for increasing product gas flow through the controller by increasing the bleed flow of product gas,
   a diaphragm enclosing a chamber and responsive to chamber pressure,
   a line coupling said chamber to said product gas at system pressure, and an outlet venting said chamber to atmospheric pressure,
   linkage means coupled to said diaphragm for controlling the operation of said bleed valve,
   altitude responsive means comprising a portion of said linkage means, said altitude responsive means modulating the bleed flow as an inverse function of altitude when chamber pressure is high, and
   a solenoid valve responsive to said PPO$_2$ monitor and said signal conditioning means for controlling chamber pressure, wherein said solenoid valve is operable to block said outlet thereby increasing the chamber pressure to equal system pressure, and wherein said solenoid valve is operable to open said outlet thereby decreasing the chamber pressure to equal atmospheric pressure,
   wherein high chamber pressure causes said bleed valve to open increasing gas flow and lowering PPO$_2$, and low chamber pressure causes said bleed valve to close decreasing gas flow and increasing PPO$_2$.

2. The controller of claim 1 further comprising:
   an aneroid comprising said altitude responsive means, and
   a stem and a stub positioned on either side of said aneroid, said aneroid, and stem, and stub comprising said linkage means.

3. The controller of claim 2 further comprising:
   adjustable spring biasing means for said bleed valve, whereby the PPO$_2$ level may be controlled relative to atmospheric pressure by varying the bias provided by the spring.

* * * * *